Feb. 28, 1967        F. H. WRIGHT        3,307,093
INDUCTION MOTORS AND STARTING ARRANGEMENTS THEREFOR
Filed Oct. 30, 1963        3 Sheets-Sheet 1

INVENTOR.
Floyd H. Wright,
BY Henry J. Marcinick
Attorney.

Feb. 28, 1967     F. H. WRIGHT     3,307,093
INDUCTION MOTORS AND STARTING ARRANGEMENTS THEREFOR
Filed Oct. 30, 1963     3 Sheets-Sheet 2

INVENTOR.
Floyd H. Wright,
BY Henry J. Macicinski
Attorney.

Feb. 28, 1967  F. H. WRIGHT  3,307,093
INDUCTION MOTORS AND STARTING ARRANGEMENTS THEREFOR
Filed Oct. 30, 1963
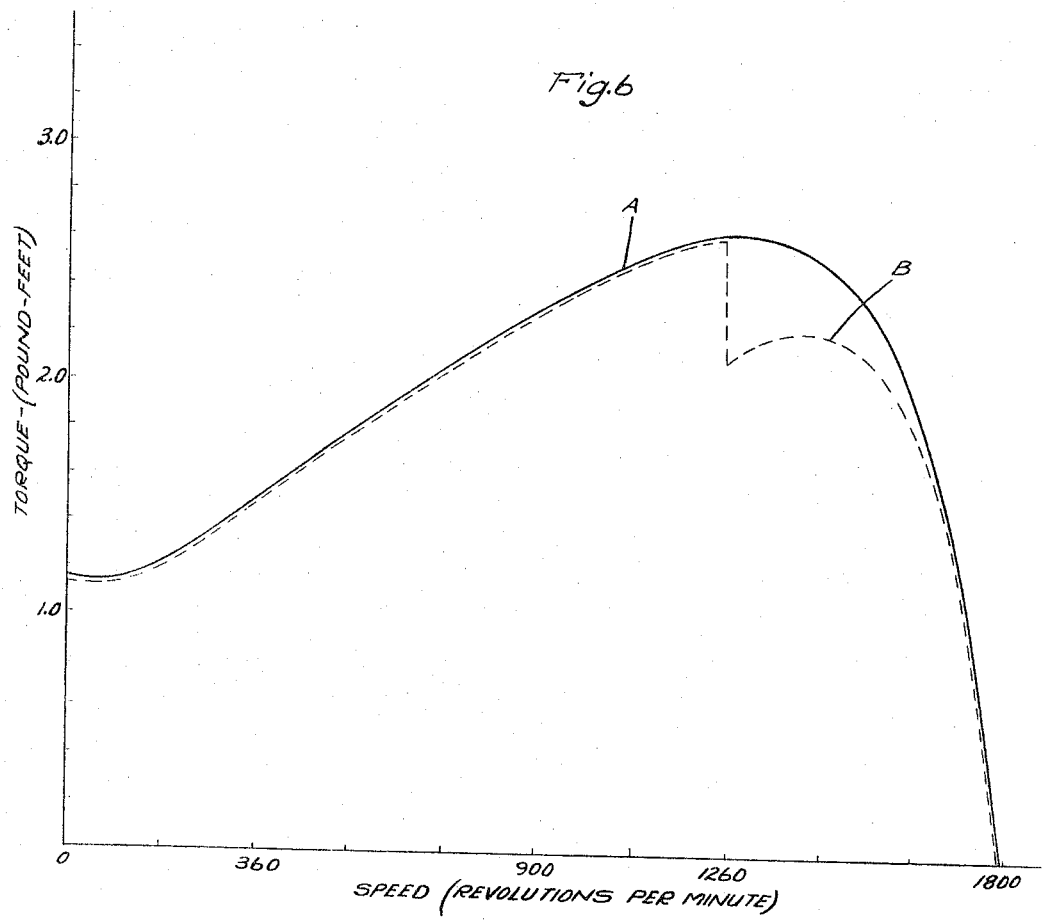
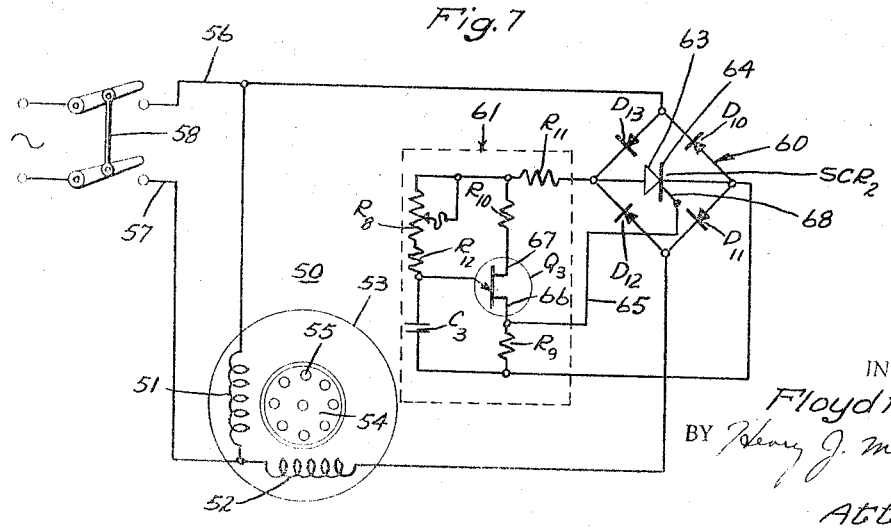
INVENTOR.
Floyd H. Wright,
BY
Attorney.

United States Patent Office 3,307,093
Patented Feb. 28, 1967

3,307,093
INDUCTION MOTORS AND STARTING
ARRANGEMENTS THEREFOR
Floyd H. Wright, Fort Wayne, Ind., assignor to General
Electric Company, a corporation of New York
Filed Oct. 30, 1963, Ser. No. 320,063
6 Claims. (Cl. 318—221)

This invention relates generally to electric motors and more particularly to an improved starting arrangement for induction motors.

A characteristic of a single phase induction motor is that some form of phase shifting arrangement must be provided for the starting winding in order that the motor will develop a starting torque. In a commonly used phase shifting arrangement a smaller gauge wire is used for the auxiliary or starting winding than for the main winding. The starting winding thereby presents a higher resistance than the main winding, and it may also be wound to present a smaller leakage reactance. This generally results in a phase displacement ranging from 20 to 30 degrees between the main winding current and starting winding current. The starting torque produced by the motor will vary approximately as the sine of the phase angle between the two currents.

A disadvantage of such a starting arrangement is that the starting winding heats rapidly if the motor fails to start quickly or if the motor is started repeatedly. In order to prevent overheating of such a starting winding in many motors, it must be disconnected after starting. To disconnect the start winding when the motor reaches a predetermined speed of rotation, a centrifugal or electromagnetic type of switching device is frequently employed. Such devices have the inherent disadvantage that they employ moving parts and electrical contacts that are susceptible to wear. There is a need therefore for a starting arrangement for induction motors that utilize static devices that do not have moving parts or electrical contacts and that are not subject to wear.

Accordingly, it is a general object of my invention to provide an improved starting arrangement for an induction motor.

A more specific object of my invention is to provide an improved starting arrangement for a single phase induction motor utilizing solid state switching devices.

A further object of the invention is to provide an improved induction motor employing a novel circuit arrangement for producing starting torque.

In accordance with one form of my invention I have provided an improved induction motor having an angularly displaced main and starting winding in which the current through the starting winding is phase controlled. The means for phase controlling the current to the starting winding preferably includes a bilateral semiconductor switching means, such as a controlled rectifier within a bridge, for controlling the interval of current conduction to the starting winding in each half cycle so that the supply of start current in each half cycle is delayed with respect to the supply of main winding current. The bilateral semiconductor switching means is connected in series circuit with the starting winding across the supply leads of the motor. During the starting condition the switching means is switched on at a predetermined angle to provide a phase controlled current to the starting winding that will produce the desired starting torque. During the running condition of the motor the angle at which the switching means is turned on is preferably delayed to reduce the interval of current conduction to the starting winding. This reduced interval of current conduction during the running condition results in an improvement in the speed-torque characteristic as compared to a resistance-start induction motor.

The subject matter which I regard as my invention is set forth in the appended claims. The invention itself, together with further objects and advantages thereof may be understood by referring to the following description taken in connection with the accompanying drawings in which:

FIGURE 6 illustrates the speed-torque curve A for the single phase motor shown schematically in FIGURE 1 and a speed-torque curve B for a comparable motor employing resistance starting; and FIGURE 7 is a schematic circuit diagram of a single phase induction motor embodying the improved starting arrangement of another form of my invention.

Figure 1:
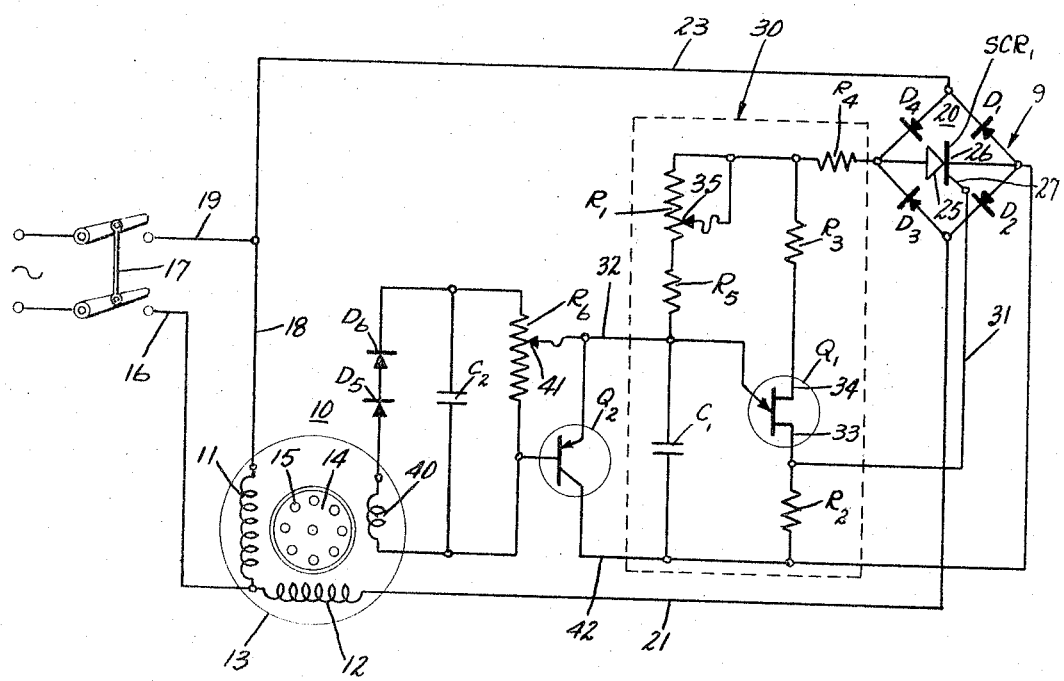
FIGURE 1 is a simplified schematic diagram of a single phase motor embodying the improved starting arrangement of one form of my invention.
Figure 2:
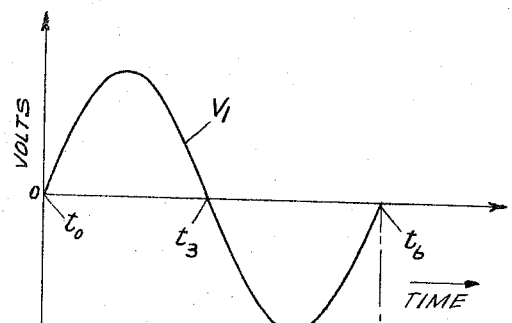
FIGURE 2 illustrates the waveform of the alternating line voltage $V_1$ supplied to the motor shown schematically in FIGURE 1.

Referring now more particularly to FIGURE 1 of the drawing, I have schematically illustrated therein an induction motor 10 having a main or running primary winding 11 and an auxiliary or starting winding 12, which are angularly displaced on the stator member 13. Preferably, for the best running performance the main and starting windings 11, 12 are displaced about 70 to 75 degrees. The motor 10 includes a rotor member 14 of any suitable type, which carries a squirrel cage secondary winding 15 and is supported for rotation relative to the stator member 13.

One end of the main winding 11 and one end of the starting winding 12 are joined in a common connection to a supply lead 16 adapted for connection to one side of an alternating current source through a line switch 17. The other end of the main winding 11 is connected to the other side of the alternating current source by supply leads 18, 19. It will be seen that the starting winding 12 is connected in circuit by leads 21 with one side of a bilateral semiconductor switching means 20 which includes a controlled rectifier $SCR_1$ and a rectifier bridge 9 formed by diodes $D_1$, $D_2$, $D_3$ and $D_4$. Lead 23 connects the other side of the bilateral semiconductor switching means 20 with supply lead 19. Thus, the starting winding 12 and the bilateral switching means 20 are connected in series circuit relation across the main winding 11 and across the power supply when line switch 17 is closed.

In accordance with the present invention, the starting winding 12 is energized with a series of alternating current excursions produced by firing the controlled rectifier $SCR_1$ at a predetermined angle in each half cycle of the alternating supply. Or in other words, the current supplied to the starting winding 12 is phase controlled. I have found that these controlled excursions of current through the starting winding 12 produce a rotating magnetic field out of phase with the field produced by the main winding and therefore can be utilized in starting an induction motor. The angle at which the controlled rectifier $SCR_1$ provided a satisfactory starting torque was determined experimentally. For the motor 10 used in the exemplification of the invention, the firing angle $\phi$ (see FIGURE 3) of the controlled rectifier $SCR_1$ during the starting condition of motor 10 was nearly 90 degrees.

The silicon controlled rectifier $SCR_1$ connected within the rectifier bridge 9 exercises full wave control of the current in the circuit branch which includes the starting winding 12. During an arbitrary half cycle of the alternating current supply when the voltage at supply lead 19 is positive with respect to the voltage at lead 17, the current flow may be traced from supply lead 19 through lead 23, diode $D_4$, controlled rectifier $SCR_1$ and diode $D_2$, the connecting lead 21, the starting winding 12 and to the supply lead 16. During an arbitrary negative half cycle when the voltage at supply lead 19 is negative with respect to the other lead 16, the path of current flow in the starting circuit branch is in a reverse direction. The current flow may be traced from supply lead 16, through the start winding 12, the connecting lead 21, diode $D_3$, the controlled rectifier $SCR_1$, diode $D_1$, the connecting lead 23 and to the supply lead 19. Thus, it will be apparent that the silicon controlled rectifier $SCR_1$ functions in conjunction with the diodes $D_1$, $D_2$, $D_3$ and $D_4$ as a bilateral switch.

The silicon controlled rectifier $SCR_1$ used in the exemplification of the invention is a well-known PNPN junction semiconductor device and includes an anode 25, a cathode 26 and a controlled element or gate 27. Silicon controlled rectifiers are particularly suitable switching devices in phase control circuits since they can be switched from a blocking to a conducting state in microseconds and can therefore phase control the current supplied to the start winding in each half cycle. These controlled rectifiers are more fully described in Chapter 1 of the General Electric Controlled Rectifier Manual, second edition, 1961, published by the Rectifier Components Department of the General Electric Company, Auburn, New York.

It will be understood that according to convention the controlled rectifier $SCR_1$ passes current only in the direction indicated by the arrow which forms a part of the symbol used to diagrammatically represent the device. The controlled rectifier $SCR_1$ can be switched to a conducting state at an anode-to-cathode voltage less than the break-over voltage of the device by supplying a low level gate-to-cathode signal. This characteristic makes it possible to use a controlled rectifier $SCR_1$ to control a substantially large current flow by a relatively small signal applied at the gate 27. Turn-off from the controlled rectifier $SCR_1$ is achieved by applying a reverse voltage across the device.

Although a silicon controlled rectifier within a rectifier bridge was used as a phase control means, it will be apparent that other phase control arrangements such as a five layer diode, a pair of silicon controlled rectifiers connected in a back-to-back arrangement or other forms of solid state bilateral switching arangements suitable for phase controlling current may be employed in the practice of the present invention.

The firing circuit 30 used in the exemplification of the invention to fire the silicon controlled rectifier $SCR_1$ is shown enclosed in the dashed rectangle. The output of the firing circuit 30 is coupled through lead 31 with the controlled rectifier $SCR_1$ so that firing pulses are supplied at the gate to fire the controlled rectifier $SCR_1$ at a selected angle. The angle is determined by the setting of the potentiometer $R_1$ and by the rate at which current is diverted from the firing circuit 30 through the feedback lead 32.

Firing circuit 30 includes a unijunction transistor $Q_1$, resistors $R_2$, $R_3$, $R_4$ and $R_5$ and capacitor $C_1$. The rate at which capacitor $C_1$ is charged to the peak emitter voltage of unijunction transistor $Q_1$ determines the frequency at which the unijunction transistor $Q_1$ is fired. When unijunction transistor $Q_1$ is fired, capacitor $C_1$ is discharged through the resistor $R_2$ to provide a signal pulse to trigger the controlled rectifier $SCR_1$ into conduction.

The resistors $R_2$ and $R_3$ connected to the base-one and base-two electrodes 33, 34, respectively, of unijunction transistor $Q_1$ are provided to limit the inter-base current to the capabilities of the unijunction transistor $Q_1$. The resistor $R_4$ functions as a voltage dropping resistor to provide the desired voltage across the serially connected unijunction transistor $Q_1$ and resistors $R_2$ and $R_3$. Resistor $R_5$ provides a fixed amount of resistance in series with capacitor $C_1$ when the adjustable arm 35 of the potentiometer $R_1$ is in the zero resistance position to stop the conduction of the transistor $Q_1$ after the capacitor $C_1$ is discharged. The firing circuit 30 used in the illustrated exemplification of the invention is more fully described in Chapter 4, pages 44–47 of the aforementioned General Electric Controlled Rectifier Manual.

It was found that for the fractional horsepower motor used in the exemplification of the invention a satisfactory starting torque was obtained when the silicon controlled rectifier $SCR_1$ was fired at approximately a 90 degree phase angle with respect to the line voltage. Further, since the starting winding 12 in the improved starting arrangement does not have to provide a specified amount of resistance, the starting winding 12 in the motor 10 could employ a wire of the same gauge as the wire used to wind the main winding 11. This results in the advantage in some applications that the starting winding 12 may be left in the circuit during the running condition of the motor since the starting winding 12 has sufficient thermal capacity. As will hereinafter be more fully discussed in connection with the speed-torque curves, the starting winding 12 was preferably supplied with a phase controlled current during the running condition by firing the controlled rectifier $SCR_1$ at a relatively delayed angle. For the induction motor 10 used in the exemplification of the invention a firing angle $\phi$ (see FIGURE 5) which was found to produce an improved breakdown torque was approximately between 120 and 140 degrees.

In order to provide the desired delayed firing angle during the running condition of the motor, a speed responsive means may be provided which will cause a delay in the firing angle when the motor 10 reaches a predetermined speed. In the embodiment illustrated in FIGURE 1 a winding or pick-up coil 40 disposed in the main winding slots was used to sense the motor speed, the voltage developed across the winding 40 being a function of the motor speed. In the fractional horsepower motor 10 used to exemplify the invention, the winding 40 had 6 turns of .005 diameter inch wire and provided approximately two volts with the motor 10 running at no-load.

The speed responsive means used to delay the firing angle of the controlled rectifier $SCR_1$ included the winding 40, a pair of serially connected diodes $D_5$ and $D_6$ connected in series circuit with the winding 40 not only provided rectification of the voltage across the winding 40 but also the sum of the forward voltage drops of the diodes $D_5$, $D_6$ was used to prevent the speed responsive circuit from coming into play during the starting condition of the motor. Capacitor $C_2$ was used to filter the feedback signal so that it would be effective over a number of cycles. The adjustable arm 41 of potentiometer $R_6$ was connected to the emitter of transistor $Q_2$ and one end of the potentiometer $R_6$ was connected to the base electrode of transistor $Q_2$ to permit adjustment of the sensitivity of the transistor amplifier by changing the resistance which shunts the base and emitter circuits. Transistor $Q_2$ was a general purpose PNP junction transistor. A General Electric 525 transistor was used successfully in the illustrated exemplification of the circuit.

Transistor $Q_2$ is operated as a common-emitter amplifier. When the transistor $Q_2$ is operated in this mode, it will be understood that the impedance between the emitter and collector of the transistor $Q_2$ will vary with the amount of current applied at the base. Since the emitter of transistor $Q_2$ is connected in circuit with the feedback lead 32 of the firing circuit 30 and the collector is connected to lead 42 joined to the negative D.C. terminal of the rectifier bridge 9, the amount of current diverted from the capacitor $C_1$ of the firing circuit will depend upon the amount of base current supplied to the transistor $Q_2$. As this current increases during the operating condition of motor 10, the current diverted from the capacitor $C_1$ is increased to thereby delay the angle at which the controlled rectifier $SCR_1$ is fired.

Figure 3:
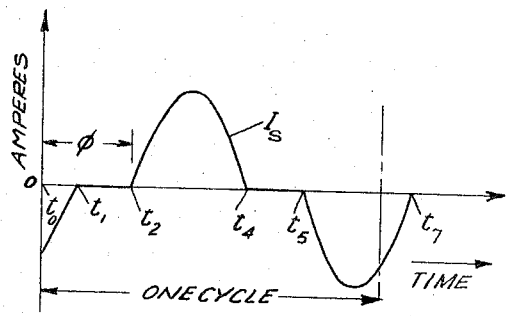
FIGURE 3 illustrates the waveform of the current $I_s$ supplied to the starting winding in the motor shown schematically in FIGURE 1.
Figure 4:
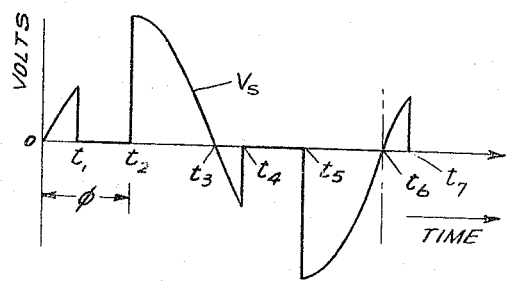
FIGURE 4 illustrates the waveform of the voltage $V_s$ across the start winding corresponding to current waveform shown in FIGURE 3 for the starting condition of the motor, the controlled rectifier of the starting arrangement shown in FIGURE 1 being fired at a firing angle $\phi$.
Figure 5:
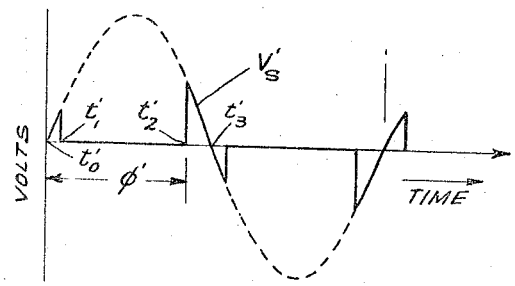
FIGURE 5 illustrates the waveform of the voltage $V_s'$ across the starting winding corresponding to a running condition of the single phase motor shown in FIGURE 1, the controlled rectifier of the starting arrangement shown in FIGURE 1 being fired at the delayed firing angle $\phi'$.

In FIGURES 3 and 4 I have illustrated the waveforms of the starting winding current $I_s$ and voltage $V_s$ respectively, during the starting condition of the motor 10. In order to show the time relationship between the current $I_s$ and the line voltage $V_1$ I have shown in FIGURE 1 the line voltage $V_1$ plotted along the same time scale. In FIGURE 5 I have illustrated a plot of the instantaneous values of the starting winding voltage $V_s'$ against time for an arbitrary cycle during the running condition of the motor 10. It will be noted that during the running condition the firing angle $\phi'$ of the controlled rectifier $SCR_1$ is delayed, and the conduction intervals $t'_0$–$t'_1$ and $t'_2$–$t'_3$ are relatively short as compared with the conduction intervals $t_0$–$t_1$ and $t_2$–$t_3$ of the controlled rectifier $SCR_1$ during the starting condition of the motor 10.

Having reference now to the motor starting arrangement shown in FIGURE 1 and to the waveforms shown in FIGURES 2–5, I will now more fully describe the operation of the motor 10. When the control switch 17 connected with an alternating current source is closed, the main winding 11, the starting winding 12 and bridge 21 are energized. A phase controlled current $I_s$ having a waveform as shown in FIGURE 3 is initially supplied to the starting winding 12. During the starting condition of the motor 10 the voltage across the pick-up coil 40 is insufficient to overcome the forward voltage drops of the diodes $D_5$ and $D_6$. Consequently, the current at the base of transistor $Q_2$ is insufficient to drive the transistor to its low impedance state, and there is no significant diversion of the current from the capacitor $C_1$. The angle at which the controlled rectifier $SCR_1$ is fired depends essentially on the RC time constant of the resistance introduced by potentiometer $R_1$ and resistor $R_5$, and the capacitance of the capacitor $C_1$.

As will be seen from the waveform of the starting winding current $I_s$, the current consists of a series of excursions or pulses. As I have previously mentioned, the controlled rectifier $SCR_1$ is triggered into conduction at an angle of about 90 degrees or at time $t_2$ as shown in FIGURE 3. When the controlled rectifier $SCR_1$ is fired during an arbitrary half cycle during the starting condition, it will be noted that the current does not instantly increase in magnitude at the time of firing because of the inductance of the starting winding 12. Further, it will be noted that the controlled rectifier $SCR_1$ is not turned off at $t_3$ when the supply voltage crosses the zero axis. The inductance of the starting winding 12 maintains the flow of current in the starting winding circuit branch for a short interval $t_3$–$t_4$. At time $t_4$ the controlled rectifier $SCR_1$ is turned off since there is sufficient reverse bias to commutate the device. During the negative half cycle of the alternating supply, the controlled rectifier $SCR_1$ is turned on at time $t_5$ and is not turned off until $t_7$ in the early portion of the next positive half cycle.

It was found that by supplying a phase controlled current to the start winding 12 in effect provides a phase displacement between the currents in the main and starting windings 11, 12 that produces the desired starting torque in motor 10. When the motor 10 reaches the predetermined speed at which the voltage across the pick-up coil 40 is sufficient to overcome the forward voltage drops of the diodes $D_5$ and $D_6$, base-drive current is supplied to transistor $Q_2$. As the base-drive current increases, the impedance between the emitter-collector junction is decreased with the result that current is diverted from the capacitor $C_1$ of the firing circuit 30 to delay the firing angle of the controlled rectifier $SCR_1$. The rectifier $SCR_1$ is fired at angle $\phi'$ shown in FIGURE 5. The delayed firing angle during the running condition provides the advantage that the speed-torque characteristics of the motor 10 may be improved. In the motor used to exemplify the invention, the start winding 12 was not effectively switched out until the motor 10 reached its synchronous speed of 1800 revolutions per minute.

In FIGURE 6 I have shown a speed-torque curve for the motor 10 used in the exemplification of the invention and for a comparable resistance start motor in which the resistance start winding was effectively switched out of the starting circuit branch after the motor reached a predetermined speed. Curve A shown in solid lines represents a plot of torque in pound-feet plotted against speed in revolutions per minute. Shown in dashed lines Curve B represents a plot of torque in pound-feet against speed in revolutions per minute for an identical motor in which the starting winding was switched out at a speed of about 1260 revolutions per minute. It will be noted that the switching action is accompanied by a sharp drop in torque. As will be seen from the speed-torque Curve A the preferred switching arrangement provides the advantage that the sharp drop in torque is eliminated. As compared with a resistance start motor in which the starting winding itself provides the resistance in the starting circuit branch, the improved phase controlled starting arrangement provides the advantage that high inertia loads can be more readily started since the starting winding has a higher thermal capacity. By allowing the starting winding 12 to remain in the circuit during the operating condition and by supplying a small amount of phase controlled current to the winding 12, the further advantage results that the breakdown torque of the motor 10 is increased.

In order to aid those skilled in the art in the practice of the present invention, a motor 10 with the improved starting arrangement shown in FIGURE 1 was constructed to operate a fractional horsepower single phase induction motor having a rating of ⅓ horsepower. The main winding 11 was wound with 12–21–29–33 turns around 2–4–6–8 teeth respectively to provide 75 effective turns, and the secondary winding 12 was wound with 17–26–32–17 turns around 3–5–7–9 teeth respectively to provide 75 effective turns. Copper wire .0359 of an inch in diameter was used for both the main and starting windings. The pick-up coil 40 in the main winding slots consisted of 6 turns (around 8 teeth) of .005 inch in diameter wire. The following circuit components which are given by way of exemplification were used:

| | |
|---|---|
| Silicon controlled rectifier $SCR_1$ | General Electric silicon controlled rectifier C35B. |
| Diodes $D_1$, $D_2$, $D_3$, $D_4$ | General Electric IN 2158. |
| Unijunction transistor $Q_1$ | General Electric 2N 492. |
| Transistor $Q_2$ | General Electric 525. |
| Potentiometer $R_1$ | 0–100,000 ohms. |
| Resistor $R_2$ | 47 ohms. |
| Resistor $R_3$ | 390 ohms. |
| Resistor $R_4$ | 10,000 ohms. |
| Resistor $R_5$ | 18,000 ohms. |
| Potentiometer $R_6$ | 0–250,000 ohms. |
| Capacitor $C_1$ | .01 microfarads. |
| Capacitor $C_2$ | 40 microfarads. |

Having more specific reference now to the schematic circuit diagram shown in FIGURE 7, I have shown therein a single phase induction motor 50 having a main and starting winding 51 and 52 incorporating the improved arrangement. The main and starting windings 51, 52 are arranged in quadrature relation and are disposed in slots on the stator member 53 of the motor 50. The motor 50 includes a rotor member 54 that carries a squirrel cage secondary winding 55 and that is supported for rotation relative to the stator member 53. The input leads 56, 57 of the motor 50 are connected to the terminals of a line switch 58 which is provided for connecting and disconnecting the motor 50 from an alternating current source.

Phase control of the current supplied to the starting winding 52 is achieved by a controlled rectifier $SCR_2$ having its anode 63 and cathode 64 connected across the D.C. terminals of a single phase bridge 60 formed by diodes $D_{10}$, $D_{11}$, $D_{12}$ and $D_{13}$. The unijunction firing circuit 61 is similar to the one used in the FIGURE 1 circuit and was employed to fire the controlled rectifier $SCR_2$ at a predetermined angle in each half cycle of the alternating current supply.

The firing circuit 61 shown enclosed in dashed outline in FIGURE 7 is coupled with the controlled rectifier $SCR_2$ through lead 65 to fire the rectifier $SCR_2$ at a selected angle controlled by potenionmeter $R_8$. The firing circuit 61 is essentially a relaxation oscillator with its input connected across the D.C. terminals of the bridge 60.

The components of the firing circuit 61 include the potentiometer $R_8$, a unijunction transistor $Q_3$, resistors $R_8$ and $R_9$ connected with the base-one and base-two electrodes 66, 67, respectively, of unijunction transistor $Q_3$, a capacitor $C_3$, a voltage dropping resistor $R_{11}$ and a resistor $R_{12}$ in series with the potentiometer $R_8$. The RC product of the capacitance of the capacitor $C_3$ and the resistance contributed by the potentiometer $R_8$ and the resistor $R_{12}$ determine the point in each half cycle at which the unijunction transistor $Q_3$ is fired. When the transistor $Q_3$ is fired, capacitor $C_3$ discharges through the resistor $R_9$ to supply a firing pulse at the gate 68 of the controlled rectifier $SCR_2$.

The operation of the motor 50 is initiated by closing the line switch 58. With switch 58 closed the main winding 51, the starting winding 52 and the fullwave bridge 60 are energized. The controlled rectifier is fired at a predetermined angle in each half cycle of the alternating current supply. This phase controlled current supplied to the starting winding 52 causes the motor to produce a starting torque. In the starting arrangement shown in FIGURE 7, the starting winding 52 was left in the circuit during the operating condition of the motor 50 since the starting winding 52 was wound with wire of the same gauge as the main winding 51 and the phase controlled current is delayed about 130 degrees in each half cycle.

From the foregoing description of the induction motors incorporating the invention, it will be apparent that a distinctly novel arrangement has been provided for starting an induction motor. With the improved starting arrangement relatively high inertia loads can be started with such motors since the starting windings can be wound with wire of the same gauge as the main winding and can withstand normal starting currents. Further, with the improved arrangement it is possible by phase controlling the starting winding current during the running condition of the motor to provide improved speed-torque characteristics.

It will be understood that the particular embodiments of the invention described herein are intended as illustrative examples of the invention and that the invention is not necessarily limited to such embodiments. Although in the particular embodiments of the invention the phase control means was connected in circuit with the starting winding, it will be apparent that the phase control means may be interchangeably connected with either of the main or start windings since either of these windings could effectively serve as a starting winding. Further, it will be apparent to those skilled in the art that the phase control means in accordance with the present invention may be connected in series circuit with both the main and the start winding of an induction motor to thereby achieve reversibility in a motor application if so desired. Also, the invention is not limited to the specific firing circuits and solid state bilateral switching networks used in the exemplification of the invention. It will be understood therefore that other modifications of the invention described herein may be made, and that it is intended by the appended claims to cover all such modifications that fall within the true spirit and scope of the invention.

What I claim as new and desire to secure by Letters Patent of the United States is:

1. A single phase induction motor having a stator member, a main winding and a starting winding physically displaced from said main winding and disposed on said stator member, a squirrel cage rotor member supported for rotation relative to said stator member, input means including at least a pair of electrical leads for connecting the main winding in circuit with an alternating power source, phase control means for controlling the interval of current conduction to the start winding in each half cycle, said phase control means including a bilateral switching means, circuit means connecting said bilateral switching means in series circuit with said starting winding and connecting said bilateral switching means and starting winding in parallel circuit relation with the main winding, said phase control means controlling the interval of current conduction to said starting winding to provide a phase controlled current during the starting condition to cause said motor to start, and means responsive to the speed of said motor to cause said phase control means to reduce said interval of current conduction to the starting winding during the running condition of the motor.

2. In an induction motor having a stator member, a main winding disposed in said stator member, a starting winding physically displaced from said main winding, a squirrel cage motor member supported for rotation relative to said stator member, and input means including at least a pair of electrical leads for connecting said main winding with an alternating power source, the improvement comprising: a bilateral semiconductor switching means, circuit means connecting said bilateral semiconductor switching means in circuit with said start winding across the main winding, firing circuit means coupled with said bilateral semiconductor switching means for firing said switching means at a first predetermined angle during the starting condition of the motor to cause a starting torque to be produced for starting said motor, and a speed responsive means coupled with said firing circuit means to cause the angle at which said bilateral semiconductor switching means is fired to be retarded during the running condition of the motor.

3. In an induction motor having a stator member, a main winding disposed in said stator member, a starting winding physically displaced on said stator member from said main winding, and input means for connecting said main winding with an alternating power source, the improvement comprising: a bilateral semiconductor switching means, circuit means connecting said semiconductor switching means in series circuit relation with said start winding and in parallel circuit relation with said main winding, and a firing circuit means coupled with said bilateral semiconductor switching means for firing said bilateral semiconductor switching means in each half cycle of the alternating power source to control the interval of current conduction to said starting winding to provide a phase controlled current to start said motor and means responsive to the speed of said motor to cause said bilateral semiconductor switching means to reduce said interval of current conduction to the starting winding during the running condition of the motor.

4. In an induction motor having a stator member, a rotor member supported for rotation relative to said stator member, a main winding and a starting winding physically displaced from said main winding, and input means for connecting the main winding in circuit with an alternating power source, the improvement comprising: a phase control means including a bilateral switching means for controlling the interval of current conduction to the start winding in each half cycle, and circuit means connecting said bilateral switching means in circuit with the start winding and connecting said start winding and said bilateral switching means in circuit across said input means, said phase control means controlling the interval of current conduction to said starting winding to provide a phase controlled current during the starting condition to cause said motor to start.

5. In an induction motor having a stator member, a rotor member supported for rotation relative to said stator member, a main winding and a starting winding disposed in said stator member, said starting winding being physically displaced from said main winding, and input means for connecting said main winding with an alternating power source, the improvement comprising a bilateral semiconductor switching means for controlling the interval of current conduction to the starting winding, circuit means connecting said bilateral semiconductor switching means in circuit with said starting winding and connecting said switching means and starting winding in parallel circuit relation with said main winding, said bilateral semiconductor switching means controlling the interval of current conduction to said starting winding to provide a phase controlled current during the starting condition of the motor to cause said motor to start.

6. In a single phase induction motor having a stator member, a rotor member supported for rotation to said stator member, a main winding and a starting winding disposed on said stator member, said starting winding being physically displaced from said main winding, input means for connecting the main winding in circuit with an alternating power source, the improvement comprising: a phase control means including at least one controlled rectifier for controlling the interval of current conduction to the start winding in each cycle of the alternating power source, and circuit means connecting said controlled rectifier in series circuit relation with said start winding and connecting said controlled rectifier and start winding in circuit across said input means, said phase control means controlling the interval of current conduction to said starting winding to provide a phase controlled current during the starting condition of the motor to cause said motor to start.

References Cited by the Examiner
UNITED STATES PATENTS

| | | | |
|---|---|---|---|
| 3,116,445 | 12/1963 | Wright | 318—220 |
| 3,202,899 | 8/1965 | Gambill | 323—23 X |
| 3,210,605 | 10/1965 | Jones. | |
| 3,226,620 | 12/1965 | Elliott | 318—221 |

ORIS L. RADER, *Primary Examiner.*

G. A. FRIEDBERG, G. RUBINSON,
*Assistant Examiners.*